United States Patent
McIntosh et al.

(10) Patent No.: US 7,870,504 B1
(45) Date of Patent: Jan. 11, 2011

(54) METHOD FOR MONITORING A GRAPHICAL USER INTERFACE ON A SECOND COMPUTER DISPLAY FROM A FIRST COMPUTER

(75) Inventors: John W. McIntosh, Boulder, CO (US); Douglas P. Simons, Fort Collins, CO (US); Jonathan D. Gillaspie, Golden, CO (US); Ray L. Bieber, Boulder, CO (US)

(73) Assignee: TestPlant Inc., Wilmington, DE (US)

( * ) Notice: Subject to any disclaimer, the term of this patent is extended or adjusted under 35 U.S.C. 154(b) by 1140 days.

(21) Appl. No.: 10/678,043

(22) Filed: Oct. 1, 2003

(51) Int. Cl.
*G06F 3/048* (2006.01)
(52) U.S. Cl. .................. 715/803; 715/704; 715/740; 715/748
(58) Field of Classification Search ................. 715/740, 715/704
See application file for complete search history.

(56) References Cited

U.S. PATENT DOCUMENTS

| | | | |
|---|---|---|---|
| 5,022,028 A | | 6/1991 | Edmonds et al. |
| 5,157,782 A | * | 10/1992 | Tuttle et al. .................. 714/45 |
| 5,249,270 A | | 9/1993 | Stewart et al. |
| 5,321,838 A | | 6/1994 | Hensley et al. |
| 5,325,377 A | * | 6/1994 | Tuttle .......................... 714/819 |
| 5,333,302 A | | 7/1994 | Hensley et al. |
| 5,335,342 A | * | 8/1994 | Pope et al. .................... 714/38 |
| 5,343,409 A | | 8/1994 | Satterfield et al. |
| 5,371,883 A | | 12/1994 | Gross et al. |
| 5,475,843 A | | 12/1995 | Halviatti et al. |
| 5,499,108 A | * | 3/1996 | Cotte et al. ................... 358/400 |
| 5,591,956 A | * | 1/1997 | Longacre et al. ........... 235/462.1 |
| 5,594,892 A | | 1/1997 | Bonne et al. |
| 5,604,509 A | * | 2/1997 | Moore et al. ................. 345/2.1 |
| 5,634,002 A | * | 5/1997 | Polk et al. .................... 714/38 |
| 5,637,851 A | * | 6/1997 | Swartz et al. .............. 235/462.2 |
| 5,646,602 A | * | 7/1997 | Gertz et al. ............... 340/825.25 |
| 5,669,000 A | | 9/1997 | Jessen et al. |
| 5,732,212 A | * | 3/1998 | Perholtz et al. ............... 709/224 |
| 5,739,809 A | * | 4/1998 | McLaughlin et al. ......... 345/594 |
| 5,778,230 A | | 7/1998 | Wimble et al. |
| 5,826,239 A | | 10/1998 | Du et al. |
| 5,874,966 A | * | 2/1999 | Polimeni et al. .............. 345/594 |
| 5,881,230 A | | 3/1999 | Christensen et al. |
| 5,889,994 A | | 3/1999 | Brown et al. |
| 5,926,638 A | | 7/1999 | Inoue |
| 5,995,663 A | * | 11/1999 | Itsuzaki et al. ............... 382/203 |
| 6,002,871 A | | 12/1999 | Duggan et al. |
| 6,005,964 A | * | 12/1999 | Reid et al. ................... 382/133 |
| 6,023,580 A | | 2/2000 | Sifter |
| 6,026,236 A | | 2/2000 | Fortin et al. |

(Continued)

*Primary Examiner*—Boris Pesin
*Assistant Examiner*—John Heffington
(74) *Attorney, Agent, or Firm*—Albert W. Watkins

(57) ABSTRACT

A high level interface between a remote computer and local computer operator permits the remote computer to be controlled via a sequence of interactions. The remote computer may be monitored for display information which is expected, and also controlled in the event the expected information either is or is not obtained. Command language extensions are provided which extend and complement a basic scripting language. Scripts with embedded command language extensions may be executed through a remote interface, permitting remote testing, operation and evaluation. The development of the scripts, including embedded command language extensions, may be prepared through execution of commands at the local computer on a depiction of the GUI received from the remote computer, and subsequently saved as a script.

68 Claims, 2 Drawing Sheets

U.S. PATENT DOCUMENTS

| | | | |
|---|---|---|---|
| 6,046,740 | A | 4/2000 | LaRoche et al. |
| 6,067,638 | A | 5/2000 | Benitz et al. |
| 6,118,447 | A * | 9/2000 | Harel .................. 717/131 |
| 6,119,247 | A | 9/2000 | House et al. |
| 6,195,765 | B1 | 2/2001 | Kislanko et al. |
| 6,249,882 | B1 | 6/2001 | Testardi |
| 6,282,701 | B1 | 8/2001 | Wygodny et al. |
| 6,292,171 | B1 * | 9/2001 | Fu et al. ............... 345/156 |
| 6,353,897 | B1 | 3/2002 | Nock et al. |
| 6,356,931 | B2 | 3/2002 | Ismael et al. |
| 6,370,589 | B1 | 4/2002 | Sieber et al. |
| 6,470,346 | B2 | 10/2002 | Morwood |
| 6,502,045 | B1 * | 12/2002 | Biagiotti ................ 702/66 |
| 6,571,003 | B1 * | 5/2003 | Hillebrand et al. ........ 382/118 |
| 6,904,389 | B2 * | 6/2005 | Hornberger et al. ....... 702/188 |
| 6,907,546 | B1 * | 6/2005 | Haswell et al. ........... 714/38 |
| 6,980,686 | B2 * | 12/2005 | Kuwabara ............... 382/145 |
| 7,046,848 | B1 * | 5/2006 | Olcott .................. 382/176 |
| 7,120,299 | B2 * | 10/2006 | Keskar et al. ............ 382/187 |
| 7,406,191 | B2 * | 7/2008 | Fujii et al. ............. 382/144 |
| 7,683,881 | B2 * | 3/2010 | Sun et al. ............... 345/156 |
| 2001/0002697 | A1 * | 6/2001 | Hiroi et al. ............. 250/310 |
| 2002/0039436 | A1 * | 4/2002 | Alumot et al. ........... 382/149 |
| 2002/0054104 | A1 * | 5/2002 | Berczik et al. ........... 345/764 |
| 2002/0099978 | A1 * | 7/2002 | Kraffert ................. 714/38 |
| 2002/0100014 | A1 * | 7/2002 | Iborra et al. ............ 717/104 |
| 2002/0101519 | A1 * | 8/2002 | Myers .................. 348/232 |
| 2002/0111813 | A1 * | 8/2002 | Capps .................... 705/1 |
| 2002/0141641 | A1 * | 10/2002 | Zhu ..................... 382/170 |
| 2002/0152169 | A1 * | 10/2002 | Dutta et al. .............. 705/45 |
| 2003/0012414 | A1 * | 1/2003 | Luo .................... 382/118 |
| 2003/0020751 | A1 * | 1/2003 | Safa et al. .............. 345/760 |
| 2003/0026457 | A1 * | 2/2003 | Nahum .................. 382/106 |
| 2003/0053675 | A1 * | 3/2003 | Kuwabara ............... 382/145 |
| 2003/0056150 | A1 * | 3/2003 | Dubovsky ............... 714/38 |
| 2003/0058277 | A1 * | 3/2003 | Bowman-Amuah ......... 345/765 |
| 2003/0066031 | A1 * | 4/2003 | Laane ................... 715/513 |
| 2003/0123733 | A1 * | 7/2003 | Keskar et al. ............ 382/187 |
| 2003/0153823 | A1 * | 8/2003 | Geiser et al. ............ 600/407 |
| 2003/0198385 | A1 * | 10/2003 | Tanner et al. ............ 382/195 |
| 2004/0049530 | A1 * | 3/2004 | Lok et al. ............... 709/201 |
| 2004/0076323 | A1 * | 4/2004 | Fujii et al. ............. 382/151 |
| 2004/0181754 | A1 * | 9/2004 | Kremer et al. ........... 715/526 |
| 2004/0201709 | A1 * | 10/2004 | McIntyre et al. ......... 348/211.2 |
| 2005/0008212 | A1 * | 1/2005 | Ewing et al. ............ 382/133 |
| 2005/0031165 | A1 * | 2/2005 | Olson et al. ............. 382/103 |
| 2005/0035877 | A1 * | 2/2005 | Kim .................. 340/870.02 |
| 2005/0082476 | A1 * | 4/2005 | Hiroi et al. ............. 250/310 |
| 2006/0228040 | A1 * | 10/2006 | Simon et al. ............ 382/254 |
| 2007/0131877 | A9 * | 6/2007 | Hiroi et al. ............ 250/492.2 |
| 2007/0217687 | A1 * | 9/2007 | Arima .................. 382/224 |
| 2009/0052750 | A1 * | 2/2009 | Steinberg et al. .......... 382/118 |
| 2009/0087042 | A1 * | 4/2009 | Steinberg et al. .......... 382/118 |
| 2009/0148033 | A1 * | 6/2009 | Alumot et al. ........... 382/149 |
| 2010/0197376 | A1 * | 8/2010 | Kerr ..................... 463/17 |

* cited by examiner

METHOD FOR MONITORING A GRAPHICAL USER INTERFACE ON A SECOND COMPUTER DISPLAY FROM A FIRST COMPUTER

BACKGROUND OF THE INVENTION

1. Field of the Invention

This invention pertains generally to computer systems, and more particularly to methods and techniques for monitoring, testing and controlling the operation of one or more computers through communications links.

2. Description of the Related Art

With the early development of computers, all processing capability was located at a single computer system. These early machines were massive structures using many vacuum tubes, the result of which was the generation of an enormous amount of heat, and an associated sensitivity to environment. With these massive structures, all processing was performed centrally at this main computer, owing to the substantial expense required for isolation and environmental control. While remote communications with a computer system were sometimes used, the use was extremely infrequent and necessarily limited owing to the poor communications capability available at the time. These limitations of the need for environmental control and lack of adequate communications capability each persisted for several decades.

Progress in the semiconductor industry, initially with compact calculators beginning shortly after 1970 and followed by much more concentrated and capable chips suitable for computers less than a decade later, diminished and has ultimately virtually eliminated the need for extensive environmental control. Likewise, communications equipment, protocols and bandwidth compression have opened up the ability for substantial remote communications that were inconceivable only a few years ago.

For years, essentially from the days of first deployment of desktop computing, when a problem was encountered with a system, a computer user would be forced to resort to verbal telephone support with the hardware manufacturer. The waiting queues for these technical support personnel were notoriously long, with on-hold waits longer than an hour commonplace. When the technical support personnel were contacted, then the user would have to work verbally with the technical support person, and the support personnel would have to rely upon the computer users accurately describing the status and events, and performing operations requested by the support personnel. This arrangement was clearly less than optimum, requiring many times the effort that would have been required for the support personnel or a technician to directly diagnose and resolve the problem. Nevertheless, heretofore there has been little available for rapidly diagnosing the source of problems.

Unfortunately, many of the same issues and challenges face software vendors as those outlined above with regard to hardware manufacturers. When a particular program is prepared, the preparation work is usually performed upon a single type of computer having a particular combination of software installed thereon. All too frequently, the code will unintentionally rely upon components or features, such as may be found in the operating system, BIOS, system components or the like, which may vary from computer to computer. These variations may be based upon the release date of the particular computer, the software available at that time, upgrades provided by other vendors at the time of installation of their software, and other factors. At the time of deployment of early versions of the software, commonly referred to as alpha or beta versions, many of the incompatibility issues with diverse computers are discovered. Unfortunately, heretofore there has been no efficient way to diagnose the incompatibility, nor to quickly test the computer or isolate the source of the problem. Help databases have been prepared where persons may look for similar problems. Nevertheless, the amount of time involved in isolating and diagnosing a problem is still enormous and a source of much waste in the industry.

Even during the development of the software, substantial testing must be done. As is known in the art of programming, while a change in one part of the source code may not be expected to have an effect elsewhere, all too frequently this expectation is incorrect. As a result, even the most minor changes require substantial testing and validation to ensure that the changes do not disrupt the performance of a program at any other point. Presently, many software companies employ persons specifically in the role of testing. These persons will be assigned the chore of interacting with the computer as though they were a regular user, trying out each of the functions and determining whether any bugs may be identified. This approach also requires substantial operation by testing personnel, and is somewhat unreliable owing to the difficulty in determining whether the testers are, in fact, completing the testing properly and thoroughly. Nevertheless, this approach still provides cost saving over discovering a problem in the field after the software or hardware has been released more generally. Furthermore, the reputation of the company is improved by having fewer problems with the released software or hardware than competitors who utilize less thorough testing.

In the area of system administration, similar problems are also encountered. An IT professional will typically be called upon to implement a new program, upgrade or other such tasks throughout an entire network or system. In such instance, the administrator will frequently be required to visit each and every computer in order to perform the necessary tasks, and to verify the proper functioning thereof. This opportunity to access the computers has been made far more difficult with the advent of mobile systems and wireless communications, where many more of the computers connected through the network are not physically accessible at any given time.

In order to verify the performance of either software, hardware or a combination of the two, and regardless of whether the verification is being driven from the perspective of a manufacturer, developer, vendor, technical support, or internal maintenance within a single organization, this verification requires substantial interaction with the computer.

In an attempt to reduce the overhead associated with software debugging, a number of persons have developed methods for testing software by using a computer program. Many of these methods send information directly to the software or hardware, thereby bypassing the normal input channels and operations. Representative of the computer testing methods are U.S. Pat. Nos. 5,371,883 to Gross et al; 6,046,740 to LaRoche et al; 6,026,236 to Fortin et al; 5,022,028 to Edmonds et al; 5,249,270 to Stewart et al; 5,321,838 and 5,333,302 to Hensley et al; 5,335,342 to Pope et al; 5,594,892 to Bonne et al; 5,881,230 to Christensen et al; 5,926,638 to Inoue; 5,669,000 to Jessen et al; 6,119,247 to House et al; 6,195,765 to Kislanko et al; 6,249,882 to Testardi; 6,282,701 to Wygodny et al; and 6,353,897 to Nock et al; and 2002/0,099,978 to Kraffert, the contents of each of which are incorporated herein for their teachings of the various methods and techniques associated with the control and operations associated with such systems. Nevertheless, no high level methods are introduced which readily permit the operator to perform the desired tests and operations on remote computers, particularly while interacting through the same or similar input devices and channels as would occur with standard human operations.

SUMMARY OF THE INVENTION

In a first manifestation, the invention is, in combination, a communications interface between a local computer and a remote system having a graphical user interface; a scripting language; and graphical user interface language extensions that enable the scripting language to control the remote system responsive to images appearing on the remote system graphical user interface.

In a second manifestation, the invention is a method for remotely testing the operation of a computer system. According to the method, a first element of the computer system graphical user interface is received. A user input action is then generated within the computer system responsive to the first element. The computer system graphical user interface is monitored for an expected second element within a predetermined time interval. A failure is signaled if the predetermined time interval elapses without detecting the expected second element.

In a third manifestation, the invention is a programmerator enabling a local system to remotely operate a computer system through local scripts and selectively respond to changes in graphical displays upon a graphical user interface of the remote computer system. A command capture interface displays a depiction of the remote system graphical user interface display and captures user input made therein. A command language set implements user input emulations representative of captured user input at the remote computer system and also implements image processing of the remote computer system graphical displays when processed by the local system. A scripting language has scripting commands that control a flow of execution of the local system in combination with command language set. An interface communicates between local system and remote computer system graphical user interface, responsive to the command and scripting languages.

OBJECTS OF THE INVENTION

Exemplary embodiments of the present invention solve inadequacies of the prior art by providing a high level interface between a computer and operator which will permit the computer to be controlled via a sequence of interactions. The computer may be monitored for display information which is expected, and also controlled in the event the expected information either is or is not obtained. The scripts may be executed through a remote interface, permitting remote testing, operation and evaluation.

A first object of the invention is to enable the execution of a plurality of user inputs directly through the computer system while responding to a video display. A second object of the invention is to enable the control of actions within the computer based upon the display. Another object of the present invention is to provide this capability using high level controls and commands that are intuitive and readily used. A further object of the invention is to enable this interaction and control to be instituted remotely through a communications interface through common Internet connection. Yet another object of the present invention is to enable both hardware and software developers to thoroughly test and evaluate the performance and operation of their developments and enhancements rapidly and with only minimal expense. An even further object of the invention is to permit a network or systems administrator to reliably, simply and quickly execute operations within an enterprise systems network, preferably without having to physically visit each of the computing devices within the network, and which would have been heretofore conducted with more time consuming, difficult and less reliable techniques.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
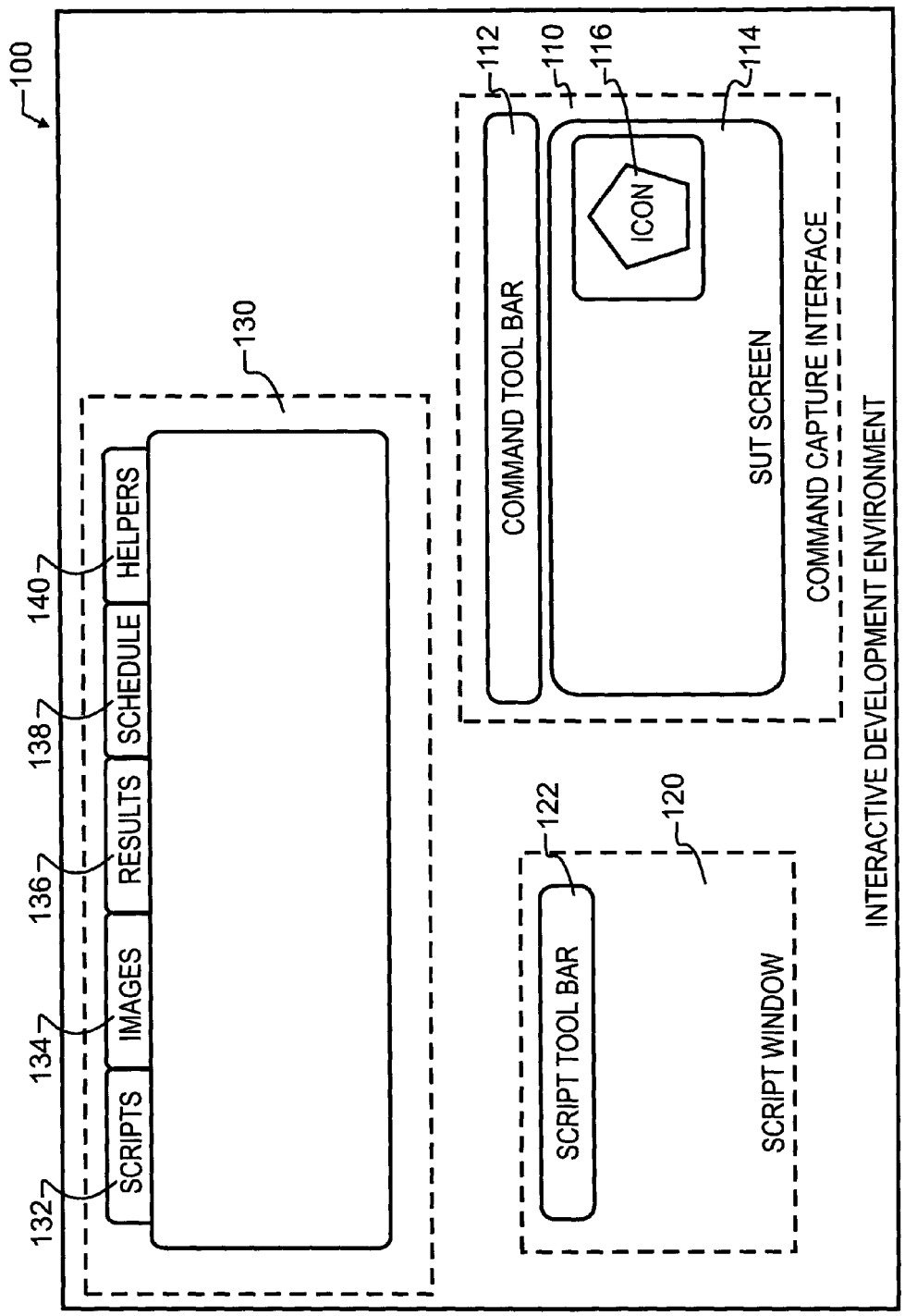
FIG. 1 illustrates a preferred graphical user interface designed in accord with the teachings of the present invention.

Manifested in the preferred embodiment, the present invention provides a computer user the ability to control any other computer connected through an interface, using the standard graphical user interface (GUI). As illustrated in FIG. 1, a user interface which takes the form of an interactive development environment (IDE) 100, will preferably include several functional windows 110, 120, 130 therein. More particularly, window 110 provides a command capture interface which most preferably provides a system-under-test (SUT) screen display 114 which provides a visual depiction of the display screen generated by the system for which the operation of the interactive development environment 100 is designed to control. Within that display there will be various graphical representations 116 that may take the form of icons as illustrated, or various buttons, message boxes, prompts or any other graphical image or control. The depiction may be an exact copy of the remote graphical user interface, a resized or scaled version, or may further include various image manipulations such as color conversions or other manipulations as deemed suitable and appropriate for a given application. A command tool bar 112 is provided which allows a user of interactive development environment 100 to select what type of command or action will most desirably be implemented at any given state within the system-under-test screen display 114. These commands will most desirably replicate the functions at the system-under-test 290 as though they were, in fact, executed directly upon that system. Preferably, such commands will include keyboard commands and mouse commands, though it will be understood that any form of user input may be emulated. Consequently, touch screen monitors, graphics pads or tablets, and any other type of primary or peripheral input device may be emulated as required and designed for. In the case of the keyboard commands, two commands may, for exemplary purposes only and not limited thereto, be implemented. The commands include a "TypeText" command and a "TypeCommand" command. These two commands permit any keyboard input available to be implemented, and yet provide a very understandable means to implement the same. In other words, where simple text must be entered, the "TypeText" command will be utilized. Where function and command keys are to be implemented, the "TypeCommand" function may be used. These commands are most preferably higher level language commands which will later be processed by a specific language extensions processor 255 described in greater detail herein below with regard to FIG. 2. Similarly, such mouse functions as "Click", "DoubleClick", "RightClick", "MouseButtonDown", "MoveTo", "Drag", and "MouseLocation( )" may be implemented. For the purposes of this disclosure, and as is commonplace in the computer arts, it will be understood that the use of parentheses denotes the implementation of a function that may include data or other variables that are being passed either from or to the function. Special commands such as "ClickAny", the operation which will be described herein below, may also be implemented.

Operation of the present invention depends upon the graphical user interface. The myriad of possible functions and displays that may be produced as a result of an operation are extensive. For example, there are times where an operation may result in an introduction of one of a variety of controls. Where a single entity is anticipated, the image of the entity can be stored through the command capture interface window 110, and, when such image is later detected during execution of a script, an appropriate action can be selected, such as the "Click" command which would represent a mouse click upon a particular point in the screen. While many times this "Click" command may be executed directly upon the entity which newly appears upon the system-under-test screen 114, the direct action upon such an entity is not required. Instead the user of interactive development environment 100 has complete control over any of the user actions that may be relayed to the system-under-test 290, such as providing typed text, commands, movement of the mouse, and so forth. Consequently, the appearance of an object may stimulate any suitable action. Where such action would be to send a click on any active component that may appear on the screen, the "ClickAny" command will most preferably be provided, which enables the click to occur on any entity that may appear. Furthermore, in one contemplated embodiment, the activation of keystrokes or mouse clicks directly within the system-under-test screen 114 may be directly transferred as commands that are captured, or there may alternatively be a button to select which initiates and subsequently stops the recording of such within system-under-test screen 114 actions.

Since the present invention is designed to control graphical user interfaces, several commands are contemplated herein, but once again not considered to be solely limiting or restricted thereto. These image commands will most preferably include screen image searching commands and specific image information. Exemplary of the screen image searching commands are such commands as "WaitFor", "WaitForAny", "WaitForAll", "RefreshScreen", "ImageFound( )", "AnyImageFound( )", "ImageLocation( )", "AnyImageLocation( )", "EveryImageLocation( )", and other similar commands. A variety of information will most preferably be obtained or obtainable with regard to specific images, through such commands as "ImageInfo( )", "FoundImageNumber( )", "FoundImageName( )", "FoundImageLocation( )" "ImageHotSpot( )", and "ImageSize( )". Utilizing the above command set, it is possible to monitor a graphical user interface for any type or shape of image and then, responsive to the presence thereof, select a subsequent user action as though the user action were being performed directly upon the system-under-test 290 rather than from a source or controlling computer. In the event an unexpected event or entity appears upon the screen, the user, through the integrated development environment 100, has the opportunity to control the operation of the local and remote systems responsive thereto. For example, if a particular object is expected to appear upon the system-under-test screen 114 within a particular time interval, and the time expires prior to the object appearing, then it would be possible for a script entered within script window 120 to time out and cause an error message or warning message or the like to appear upon the local computer screen. The scripting window will most preferably provide access to functions and commands through, for exemplary purposes only, script tool bar 122 that are commonly associated with or available through any of the various scripting languages or more fundamental programming languages. Such functionality as decision structures, loops, timers, and the various other myriad of functions available therein as are well known will most preferably be incorporated herein, in accord with the particular language incorporated herewith or developed for operation herein. One such example is "SenseTalk", though other suitable scripting languages are certainly contemplated herein, and will be dependent upon the preferred operating platform or cross-platform capability desired.

Most preferably, interactive development environment 100 will additionally include a window 130 which provides access to various organizational functions, which may, in the preferred embodiment, be implemented using the familiar index tab analogy. Among the available index tabs may, for exemplary purposes only, be functions such as the storage of various scripts 132, images 134, results from past script executions 136, scheduling of planned script executions 138, and the identification and or the location of helper script and image files 140, which may be local, on a network, or located anywhere on the Web.

Figure 2:
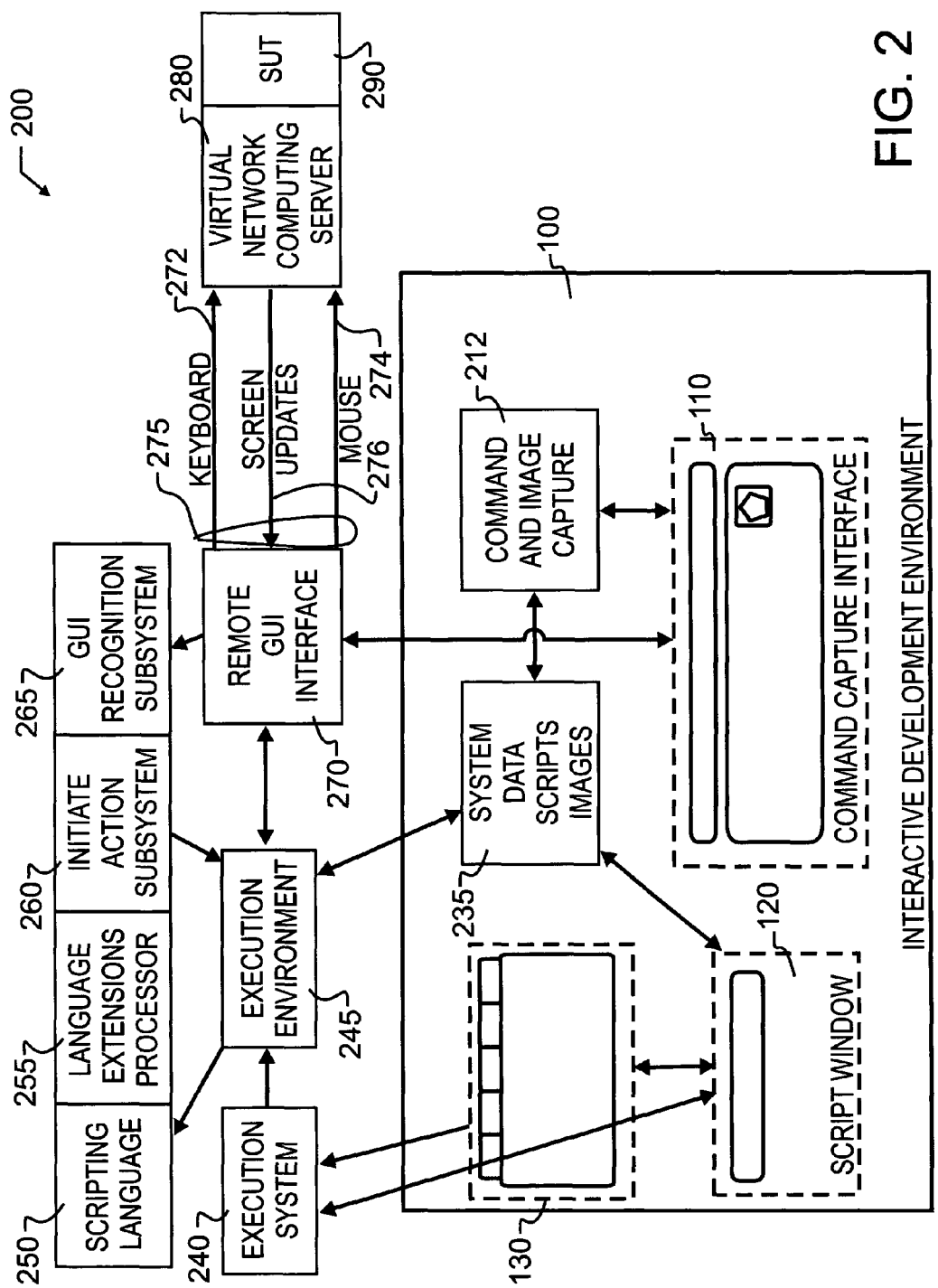
FIG. 2 illustrates a preferred functional block diagram for the execution of functions designed in accord with the teachings of the present invention.

While FIG. 1 provides a basic overview of the user view provided through the interactive development environment 100, FIG. 2 illustrates the functional interconnection of the interactive development environment 100 components with the various additional components that are not visible upon the screen to form the preferred programmerator system 200. More particularly, the presentation of the system-under-test screen 114 is achieved by a remote GUI interface 270. A command and image capture system 212 is responsible for the capture of appropriate commands from command tool bar 112 and image information such as icon 116. Consequently, when a user selects a particular command, such as a mouse click or the like, this command must be captured and incorporated into the appropriate scripting information. Likewise, the inclusion of an expected image or others of the herein above described image or user control commands must be incorporated. These commands, which are not native to prior art operating systems, programming or scripting languages, are passed through to the system data, scripts and images controller 235. Controller 235 is responsible for the appropriate redirection and incorporation of command, graphics and scripts between execution environment 245, script window 120, and command and image capture system 212. For example, when a command is received from command and capture system 212, this command and any associated language will preferably be inserted into scripting window 120. Likewise, the passing of images from the execution environment 245 will occur through controller 235. Script window 120, which would in operation contain an active script, may be processed directly through execution system 240 for a real-time run, or may be passed through organizational window 130 for storage and scheduling therein.

Ultimately, a given script will be executed through the execution system 240, which is configured to carry out the processes specified within a script. While somewhat simplistic in description, the execution system 240 and execution environment 245 are typically comprised by the local CPU, memory, OS, and the like. The command processor or CPU will effect or control much of the execution within system 240, but will be monitoring a diverse set of status indicators, potentially both locally and at the system-under-test 290, programming calls, and the like. These various items being monitored comprise in part the execution environment 245.

As the script is being processed, execution environment 245 will need to call the scripting language processor 250, which may be an interpreter, compiler or other suitable language processor. The scripting language has been extended in the preferred embodiment by various GUI commands and controls that are created through the command capture interface 110, such as the various mouse events and the like. Consequently, these commands must be processed not by the scripting language processor 250, but instead by a language extensions processor 255. As a result of the processing of the scripting language and the language extensions, an action may require to be initiated, which would be detected and triggered in the initiate action subsystem 260, which will relay the action back to execution environment 245. In the event this is an action intended for the system-under-test 290, such action will be relayed from execution environment 245 through remote GUI interface 270. The purpose of the remote GUI interface 270 is to implement an interface with the remote system-under-test 290, preferably relatively independently of the characteristics of communications channel 275 used and the data exchange rate associated therewith. This consists of providing client function to facilitate communication with the GUI server on the remote system-under-test 290, and to implement any needed out-of-band communication. Included are such operations as the client-server functions of retrieving images, sending keyboard and mouse commands, and initiating error recovery procedures as needed.

Communications channel 275 will in the preferred embodiment include a keyboard channel 272, mouse channel 274, and a transfer of screen updates from VNC server 280 back to the remote GUI interface 270. Communications channel 275 may be a high speed trunk line or cable, or may alternatively be a relatively slow-speed dial-up or RS-232 type connection. With proper selection of components, the preferred embodiment has much flexibility to operate through diverse communications channels having very different data transfer rates and signal to noise ratios.

To achieve broader application to more and more diverse systems-under-test 290, remote GUI interface 270 through a communications channel 275 communicates with remote computer virtual network computing server 280 or the like. As illustrated herein, the remote GUI interface 270 and VNC server 280 are most preferably VNC components which are readily available commercially and which operate as cross-platform components to directly interface with a remote system GUI. Nevertheless, other standard interfaces may be supported.

Images from the system-under-test 290 GUI will be relayed through VNC server 280 or the equivalent back to local system remote GUI interface 270, and from there routed to the GUI recognition subsystem 265. GUI recognition subsystem 265 dynamically scans the screen image of the remote system-under-test 290 for any bit-map images which the initiate action subsystem 260 is searching for. The goal of GUI recognition subsystem 265 is to locate images and signal the presence of such images to the initiate action subsystem 260 through an image detection signal, initiate recovery procedures such as moving the mouse cursor to locate images, or to report that the sought-after images are not available. GUI recognition subsystem 265 cooperates with the initiate action subsystem 260 and language extensions processor 255 output to determine whether a desired event or image has been created and if so, to execute the desired image identification actions requested within the language extensions received from language extension processor 255 through the execution environment 245.

Initiate action subsystem 260 initiates any action requested by the language extensions received from language extensions processor 255, which could be active commands to type text through the keyboard or to move the mouse in a number of ways. The commands may also in the preferred embodiment include passive commands to search the screen image on a continuing basis for a specific bit-map image, and, for exemplary purposes, terminating the search after a given period of time has elapsed.

While the preferred embodiment programmerator system 200 depends upon GUI image location, this may be practiced in one of several different ways. One approach is to directly map bits and to locate based upon this matching bit pattern. Said another way a black border with a blue interior and a yellow button bar may comprise the image of interest, which might, in this case, be a control or graphic. However, when some potential systems-under-test 290 are configured with a different color scheme, the same control may be comprised of a different color set and would, using this simpler approach, go undetected. Several approaches may be used to overcome this limitation. One such approach is to develop a custom color scheme at the local computer, in effect translating the remote system-under-test 290 display to the local color scheme. This may, for example, be achieved by access the system-under-test 290 and determining the color scheme being implemented within the operating system or the like to determine what color translations are required to restore color variations to a common baseline. Another approach is to map and convert the images based upon geometry into particular color sets. Yet another approach is to convert to black and white colors. Depending upon the design and intent, and the types of systems to be tested or controlled, one or more approaches may be provided or available within the operation of the programmerator system 200.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A method for using a first computer system to remotely monitor and interact with the operation of a second computer system through a graphical user interface of said second computer system, comprising the steps of:

receiving a bitmap image of said second computer system graphical user interface at said first computer system;

searching said bitmap image of said second computer system graphical user interface for a first graphical element contained within and comprising less than said bitmap image through an automated execution of said first computer system commands;

responsive to said receiving step and results of said searching step, generating a user peripheral input device input action within said second computer system graphical user interface as interpreted by said second computer by automatically creating and passing a signal through a communications channel from said first computer system to said second computer system graphical user interface;

monitoring said bitmap image of said second computer system graphical user interface automatically from said first computer system for an expected second graphical element contained within and comprising less than said bitmap image within a predetermined time interval; and signaling a failure at said first computer system if said predetermined time interval elapses without detecting said expected second graphical element.

2. The method of claim 1 further comprising the steps of:
providing graphical user interface language extensions commands to a scripting language; and
passing said generated user input action through said graphical user interface language extensions from a scripting language processor to a language extensions processor.

3. The method of claim 1 further comprising the steps of:
generating a user input action within said second computer system responsive to said second graphical element;
monitoring and searching said second computer system graphical user interface automatically from said first computer system for an expected third graphical element contained within and comprising less than said bitmap image within a predetermined time interval; and
signaling a failure at said first computer system if said predetermined time interval elapses without detecting said expected third graphical element.

4. The method of claim 1 further comprising the steps of:
depicting said second computer system graphical user interface upon a local display of said first computer system including said first graphical element; and
receiving a local user input action at said first computer system within said local display;
wherein said generated user input action emulates said local user input action.

5. The method of claim 1 further comprising the steps of:
providing graphical user interface language extensions commands to a scripting language;
depicting said computer system graphical user interface upon a local display of said first computer system including said first graphical element;
receiving a local user input action within said local display;
transferring said user input action to a script stored on said first computer system;
passing said generated user input action through said graphical user interface language extensions from a scripting language processor to a language extensions processor for reproduction at said second computer system graphical user interface, wherein said generated user input action emulates said local user input action; and
re-executing said steps of receiving, searching, generating, monitoring and signaling subsequent to said storing step under control of said stored script.

6. The method of claim 1, wherein said step of generating a user peripheral input device input action further comprises locating said user peripheral input device input action within said first graphical element.

7. The method of claim 6, wherein said user peripheral input device input action further comprises a click event.

8. The method of claim 1, further comprising the step of converting said received bitmap image of said second computer system graphical user interface into a variant different from said second computer system graphical user interface prior to said searching step.

9. The method of claim 8, wherein said step of converting further comprises color translations.

10. The method of claim 9, wherein said color translations further comprises mapping and conversion of said second computer system graphical user interface into particular color sets based upon geometry.

11. The method of claim 1, wherein said step of searching further comprises determining the location of said first graphical element when said first graphical element is found within said second computer system graphical user interface.

12. The method of claim 1, wherein said step of searching further comprises searching for additional occurrences of said first graphical element within said second computer system graphical user interface when said first graphical element is found within said second computer system graphical user interface.

13. A method for enabling a local system to automatically remotely operate a remote computer system through a graphical user interface on said remote computer system by using local scripts that selectively respond to changes in graphical displays upon said graphical user interface of said remote computer system, comprising the steps of:
displaying a depiction of said remote system graphical user interface display on said local system;
capturing user input effected in said depiction of said remote system graphical user interface display;
implementing automatically through a local system command language set user input emulations that are representative of said captured user input when reproduced at said remote computer system graphical user interface through a peripheral input device channel;
image processing said remote computer system graphical displays automatically using a local system script that searches for and detects a first entity contained within and comprising less than said graphical display upon said graphical user interface of said remote computer system;
controlling a flow of execution of said local system automatically through a scripting language having scripting commands in combination with said command language set, said flow which varies responsive to a result of detection of said first entity during said image processing step; and
communicating said user input emulations between said local system and said remote computer system graphical user interface through a communication interface responsive to said flow controlling step.

14. The method for enabling a local system to remotely operate a remote computer system through a graphical user interface on said remote computer system of claim 13 further comprising the steps of:
storing said scripting commands into a storing means;
inserting a command from said command language set into said storing means; and
executing said inserted stored command.

15. The method of claim 13, wherein said step of communicating between said local system and said remote computer system graphical user interface further comprises locating a user peripheral input device input action at a location relative to said first entity.

16. The method of claim 15, wherein said user peripheral input device input action further comprises a click event.

17. The method of claim 13, further comprising the step of converting said depiction of said remote system graphical user interface into a variant different from said remote system graphical user interface prior to said searching step.

18. The method of claim 17, wherein said step of converting further comprises color translations.

19. The method of claim 18, wherein said color translations further comprises mapping and conversion of said remote system graphical user interface into particular color sets based upon geometry.

20. The method of claim 13, wherein said step of image processing further comprises determining the location of said first graphical entity when said first graphical entity is found within said remote system graphical user interface.

21. The method of claim 13, wherein said step of image processing further comprises detecting additional occurrences of said first graphical entity within said remote system graphical user interface when said first graphical entity is found within said remote system graphical user interface.

22. A method for using a first computer system to remotely monitor and interact with the operation of a second computer system through a graphical user interface of said second computer system, comprising the steps of:
- receiving a representation of said second computer system graphical user interface at said first computer system;
- searching said representation of said second computer system graphical user interface for a first graphical entity contained within and comprising less than said representation of said second computer system graphical user interface through an automated execution of said first computer system commands; and
- responsive to said receiving step and results of said searching step, generating a user peripheral input device input action within said second computer system graphical user interface as interpreted by a second computer by automatically creating and passing a signal through a communications channel from said first computer system to said second computer system graphical user interface.

23. The method of claim 22 further comprising the steps of:
- providing graphical user interface language extensions commands to a scripting language; and
- passing said generated user input action through said graphical user interface language extensions from a scripting language processor to a language extensions processor.

24. The method of claim 22 further comprising the steps of:
- depicting said second computer system graphical user interface upon a local display of said first computer system including said first graphical entity; and
- receiving a local user input action at said first computer system within said local display;
- wherein said generated user input action emulates said local user input action.

25. The method of claim 22, wherein said step of generating a user peripheral input device input action further comprises locating said user peripheral input device input action within said first graphical entity.

26. The method of claim 25, wherein said user peripheral input device input action further comprises a click event.

27. The method of claim 22, further comprising the steps of:
- monitoring and searching said second computer system graphical user interface automatically from said first computer system for an expected second graphical entity within a predetermined time interval; and
- signaling a failure at said first computer system if said predetermined time interval elapses without detecting said expected second graphical entity.

28. The method of claim 27 further comprising the steps of:
- generating a user input action within said second computer system responsive to said second graphical entity;
- monitoring and searching said second computer system graphical user interface for an expected third graphical entity within a predetermined time interval; and
- signaling a failure at said first computer system if said predetermined time interval elapses without detecting said expected third graphical entity.

29. The method of claim 27 further comprising the steps of:
- providing graphical user interface language extensions commands to a scripting language; and
- depicting said computer system graphical user interface upon a local display of said first computer system including said first graphical entity;
- receiving a local user input action within said local display;
- transferring said user input action as a command to a script stored on said first computer system;
- passing said generated user input action command through said graphical user interface language extensions from said a scripting language processor to a language extensions processor for reproduction at said second computer system graphical user interface, wherein said generated user input action command emulates said local user input action; and
- re-executing said steps of receiving, generating, monitoring and signaling subsequent to said storing step under control of said stored script.

30. The method of claim 22, further comprising the step of converting said received representation of said second computer system graphical user interface into a variant different from said second computer system graphical user interface prior to said searching step.

31. The method of claim 30, wherein said step of converting further comprises color translations.

32. The method of claim 31, wherein said color translations further comprises mapping and conversion of said second computer system graphical user interface into particular color sets based upon geometry.

33. The method of claim 22, wherein said step of searching further comprises determining the location of said first graphical entity when said first graphical entity is found within said second computer system graphical user interface.

34. The method of claim 22, wherein said step of searching further comprises searching for additional occurrences of said first graphical entity within said second computer system graphical user interface when said first graphical entity is found within said second computer system graphical user interface.

35. A method for enabling a first computing machine to remotely operate a second computing machine through a graphical user interface on said second computing machine by using computing scripts that selectively respond to changes within graphical displays upon said graphical user interface of said second computing machine, comprising the steps of:
- displaying a depiction of said second computing machine graphical user interface display on a graphical user interface of said first computing machine;
- capturing user input effected in said depiction of said second computing machine graphical user interface display;
- image processing said second computing machine graphical displays using a first computing machine script that searches for and detects the presence of a first entity contained within and comprising less than said graphical display upon said graphical user interface of said second computing machine;
- controlling a flow of execution of said first computing machine through a scripting language having scripting commands in combination with said a command language set, said flow which varies responsive to a result of detection of said first entity during said image processing step; and implementing user input commands at said second computing machine graphical user interface emulating said captured user input by communicating between said first computing machine and said second computing machine graphical user interface through a communication interface responsive to said flow controlling step, a first user input command implemented responsive to a detection of said first entity during said image processing step and a second user input command different from said first user input command implemented responsive to a non-detection of said first entity during said image processing step.

36. The method for enabling a first computing machine to remotely operate a second computing machine through a graphical user interface on said second computing machine of claim 35 wherein said step of implementing user input commands further comprises locating user input commands at a location determined relative to said first entity.

37. The method for enabling a first computing machine to remotely operate a second computing machine through a graphical user interface on said second computing machine of claim 36 wherein said step of implementing user input commands further comprises locating user input commands directly upon said first entity.

38. The method for enabling a first computing machine to remotely operate a second computing machine through a graphical user interface on said second computing machine of claim 35 wherein said first entity further comprises an icon.

39. The method for enabling a first computing machine to remotely operate a second computing machine through a graphical user interface on said second computing machine of claim 35 wherein said first entity further comprises a graphical control.

40. The method for enabling a first computing machine to remotely operate a second computing machine through a graphical user interface on said second computing machine of claim 35 wherein said first entity further comprises a prompt.

41. The method for enabling a first computing machine to remotely operate a second computing machine through a graphical user interface on said second computing machine of claim 35 wherein said first entity further comprises a command button.

42. The method for enabling a first computing machine to remotely operate a second computing machine through a graphical user interface on said second computing machine of claim 35 wherein said first entity further comprises a message box.

43. The method for enabling a first computing machine to remotely operate a second computing machine through a graphical user interface on said second computing machine of claim 35 wherein said second computing machine further comprises a virtual network computing component.

44. The method of claim 35, further comprising the step of converting said depiction of said second computing machine graphical user interface into a variant different from said second computing machine graphical user interface prior to said searching.

45. The method of claim 44, wherein said step of converting further comprises color translations.

46. The method of claim 45, wherein said color translations further comprises mapping and conversion of said second computing machine graphical user interface into particular color sets based upon geometry.

47. The method of claim 35, wherein said searching further comprises determining the location of said first entity when said first entity is found within said second computing machine graphical user interface.

48. The method of claim 35, wherein said searching further comprises searching for additional occurrences of said first entity within said second computing machine graphical user interface when said first entity is found within said second computing machine graphical user interface.

49. A method for using a first computer system to remotely monitor and interact with the operation of a second computer system through a graphical user interface of said second computer system, comprising the steps of:

receiving a bitmap image of said second computer system graphical user interface at said first computer system;

searching said bitmap image of said second computer system graphical user interface for a first graphical element contained within and comprising less than said bitmap image through an automated execution of said first computer system commands;

responsive to said receiving step and a not-found result of said searching step, generating a first user peripheral input device input action within said second computer system graphical user interface by automatically creating and passing a signal through a communications channel from said first computer system to said second computer system graphical user interface;

and responsive to said receiving step and a found result of said searching step, generating a second user peripheral input device input action within said second computer system graphical user interface different from said first user peripheral input device input action by automatically creating and passing a signal through a communications channel from said first computer system to said second computer system graphical user interface.

50. The method for using a first computer system to remotely monitor and interact with the operation of a second computer system through a graphical user interface of said second computer system of claim 49, further comprising the steps of:

monitoring and searching said bitmap image of said second computer system graphical user interface automatically from said first computer system for an expected second graphical element contained within and comprising less than said image within a predetermined time interval; and signaling a failure at said first computer system if said predetermined time interval elapses without detecting said expected second graphical element.

51. The method of claim 49, further comprising the step of converting said received representation of said second computer system graphical user interface into a variant different from said second computer system graphical user interface prior to said searching step.

52. The method of claim 51, wherein said step of converting further comprises color translations.

53. The method of claim 52, wherein said color translations further comprises mapping and conversion of said second computer system graphical user interface into particular color sets based upon geometry.

54. The method of claim 49, wherein said step of searching further comprises determining the location of said first graphical element when said first graphical element is found within said second computer system graphical user interface.

55. The method of claim 49, wherein said step of searching further comprises searching for additional occurrences of said first graphical element within said second computer system graphical user interface when said first graphical element is found within said second computer system graphical user interface.

56. A method for enabling a first computing machine to remotely operate a second computing machine through a graphical user interface on said second computing machine by using computing scripts that selectively respond to changes within graphical displays upon said graphical user interface of said second computing machine, comprising the steps of:
   displaying a depiction of said second computing machine graphical user interface display on a graphical user interface of said first computing machine;
   image processing said second computing machine graphical displays using a first computing machine search command set that searches for and detects the presence of a first entity contained within and comprising less than said graphical display upon said graphical user interface of said second computing machine;
   controlling a flow of execution of said first computing machine through a scripting language having scripting commands in combination with a command language set, said flow which varies responsive to a result of detection of said first entity during said image processing step; and
   communicating between said first computing machine and said second computing machine graphical user interface through a communication interface responsive to said flow controlling step, a first user input command implemented at said second computing machine responsive to a detection of said first entity during said image processing step and a second user input command different from said first user input command implemented at said second computing machine responsive to a non-detection of said first entity during said image processing step.

57. The method for enabling a first computing machine to remotely operate a second computing machine through a graphical user interface on said second computing machine of claim 56, wherein said first and second user input commands are implemented at said second computing machine graphical user interface by transmitting signals from said first computing machine to said second computing machine graphical user interface through a peripheral input device channel.

58. The method of claim 56, further comprising the step of converting said depiction of said second computing machine graphical user interface into a variant different from said second computing machine graphical user interface prior to said searching.

59. The method of claim 58, wherein said step of converting further comprises color translations.

60. The method of claim 59, wherein said color translations further comprises mapping and conversion of said second computing machine graphical user interface into particular color sets based upon geometry.

61. The method of claim 56, wherein said searching further comprises determining the location of said first entity when said first entity is found within said second computing machine graphical user interface.

62. The method of claim 56, wherein said searching further comprises searching for additional occurrences of said first entity within said second computing machine graphical user interface when said first entity is found within said second computing machine graphical user interface.

63. A method for enabling a first computing machine to remotely operate a second computing machine through a graphical user interface on said second computing machine by using computing scripts that selectively respond to changes within graphical displays upon said graphical user interface of said second computing machine, comprising the steps of:
   displaying a depiction of said second computing machine graphical user interface display on a graphical user interface of said first computing machine;
   capturing user input effected in said depiction of said second computing machine graphical user interface display;
   developing at least one computing script incorporating user input into said first computing machine selected from ones of various scripting functions and commands, said at least one computing script further incorporating said captured user input;
   image processing said second computing machine graphical displays using a first computing machine search command set that searches for and detects the presence of a first entity contained within and comprising less than said graphical display upon said graphical user interface of said second computing machine;
   controlling a flow of execution of said first computing machine through said at least one computing script, said flow which varies responsive to a result of detection of said first entity during said image processing step; and
   implementing user input commands at said second computing machine graphical user interface emulating said captured user input by communicating between said first computing machine and said second computing machine graphical user interface through a communication interface responsive to said flow controlling step, a first user input command implemented at said second computing machine graphical user interface responsive to a detection of said first entity during said image processing step and a second user input command different from said first user input command implemented at said second computing machine graphical user interface responsive to a non-detection of said first entity during said image processing step.

64. The method of claim 63, further comprising the step of converting said depiction of said second computing machine graphical user interface into a variant different from said second computing machine graphical user interface prior to said searching step.

65. The method of claim 64, wherein said step of converting further comprises color translations.

66. The method of claim 65, wherein said color translations further comprises mapping and conversion of said second computing machine graphical user interface into particular color sets based upon geometry.

67. The method of claim 63, wherein said searching further comprises determining the location of said first entity when said first entity is found within said second computing machine graphical user interface.

68. The method of claim 63, wherein said step of searching further comprises searching for additional occurrences of said first entity within said second computing machine graphical user interface when said first entity is found within said second computing machine graphical user interface.

* * * * *